Patented Apr. 10, 1934

1,953,984

UNITED STATES PATENT OFFICE 1,953,984

MANUFACTURE OF RUBBER BONDED ABRASIVE ARTICLES

Harry C. Martin, Niagara Falls, N. Y., assignor to The Carborundum Company, Niagara Falls, N. Y., a corporation of Pennsylvania No Drawing. Application January 6, 1928, Serial No. 245,032. Renewed January 17, 1933

15 Claims. (Cl. 18—50)

The present invention relates to the manufacture of rubber bonded abrasive articles, and more especially to the preparation of the rubber bond and its incorporation with the abrasive grains.

In the commercial manufacture of rubber bonded abrasive articles, such as abrasive wheels, the usual practice has been to mill the abrasive grains and the vulcanizing agents into previously coagulated rubber by repeatedly passing the materials between heavy metal rolls. This procedure requires considerable time and crushes the abrasive grains into smaller sizes. Furthermore, it results in considerable wear on expensive machinery.

I have found that a superior product may be made without the above disadvantages in manufacture, by starting with a different form of rubber which I may term "rubber curd". The term "rubber curd" is used to designate a curdled form of rubber consisting of a viscous, mushy, semi-solid yet stirrable mass of a liquid, such as water, and rubber particles distributed therein. The rubber particles are so densely or closely distributed as to impart to the mass sufficient viscosity to keep the abrasive grains, such as the granular silicon carbide or fused alumina, in suspension during the time that the mixture is being worked, for example, thirty minutes or more. This viscosity is usually greater than 300 seconds Saybolt at 70° Fahrenheit.

The rubber exists in the form of particles which are approximately .002 millimeters in diameter and exhibit little or no Brownian movement, as contrasted with the rubber as it exists in latex. Latex may be transformed into rubber curd by some curdling process which results in transforming the rubber from the latex form into the curdled form. This curdling may be produced by different methods, such for example, as:

1. The neutralization of the negative electrical charges on the rubber particles by the addition of positively charged particles.

2. The removal of water by mechanical means, such as by centrifuging to such an extent as to transform the latex into a curd.

3. The addition of salts such as lead acetate or aluminum sulphate.

The curdling operation is similar in its action to the coagulation of latex into crepe rubber, but it is not carried so far. The rubber particles of the rubber curd appear to be discrete, that is, they do not form a connected structure as in the fully coagulated or crepe rubber produced by the full action of a coagulant, such as acetic acid, upon latex. While the mass is semi-solid and sufficiently viscous to hold the abrasive grains in suspension during working so that the abrasive articles can be properly formed without gravity separation of the abrasive grains from the binder, the mass is sufficiently stirrable or mobile so that the abrasive grains can be stirred into the mass, thus allowing the abrasive grains to be distributed through the mass.

Compounding ingredients known to the art may be added to the rubber curd or to the latex before coagulation in order to impart their known respective characteristics. In these cases, it is sometimes necessary to use more fluid consistencies than that mentioned above. Water to allow for the absorptive effect of such fillers may be added therefore. In all cases the consistency of the mass is such as to maintain the grains in suspension.

In order that the articles may be vulcanized, a vulcanizing agent, such as sulphur, is used. This is preferably introduced into the rubber latex before it is curdled. The sulphur is preferably introduced in the form of a water dispersion which may be made by grinding sulphur in water containing a small amount of a protective colloid, such as casein. The sulphur may be ground until the resulting particles of sulphur have a diameter of less than .001 millimeters. Other possible methods are to add finely powdered sulphur to the curd, or to mix the sulphur with the dry ingredients and then add to the curd, or any other suitable method.

In making an abrasive article, such as an abrasive wheel, the dispersed sulphur is mixed with the latex which is curdled. This curdling may be accomplished in the following manner. A saturated solution of lead acetate is slowly added with constant stirring to the latex, in an amount equal to approximately 10% of the rubber content of the latex. This produces a viscous, mushy mass. Then the curdled mass is stirred with the abrasive grains. The rubber curd is sufficiently viscous as to overcome the separation or gravity settling out of the grains which would occur in case a thin and more mobile dispersion of rubber, such as untreated latex, were used.

While it is preferred to carry the curdling of the latex to a point where the curdling alone will give the necessary viscosity to support the abrasive grains, the curdling may not be carried to this point, but the latex may be partially thickened by curdling and partially by the addition of some absorbent or thickening material such as wood flour, soap, glue, etc., to a consistency sufficient to prevent the segregation or settling out of the abrasive particles. Therefore, when I speak of curdling of the latex I do not mean that the curdling is necessarily carried to the point where it alone is depended upon to give the desired viscosity.

If desired, concentrated latex may be used. In concentrated latex water is removed, thus concentrating the rubber suspension, which because of the removal of the water is of a thicker consistency than the original latex. If concentrated latex be used, it should be thickened by a curdling operation or by the addition of some thickening material.

In making an abrasive article, such as a grinding wheel, the abrasive mixture may contain, as a typical example, seventy parts by weight of abrasive grains, four parts by weight of sulphur and eight parts by weight of rubber as rubber curd.

Then the wet mix is shaped into a blank by tamping into a mold. The blank is then dried in a gradually reduced pressure starting at atmospheric and finishing at about twenty-nine inches of mercury vacuum at a minimum temperature generally less than 160° Fahrenheit. An alternative humidity drying procedure may be followed, or if desired, a pressing operation may be used to remove a portion of the water. When the blank is dried, it is placed in a mold and heated to about the melting point of sulphur (115° centigrade), under a pressure of about 100 pounds per square inch for about three to ten minutes. Following this slight pressure, a pressure of 5000 pounds per square inch is applied for about five minutes while the article is still held at a temperature of 115° centigrade. The article which is thus formed is then removed from the mold and vulcanized in the usual manner.

Instead of first making a blank and drying it, and then shaping the dried blank under pressure to the finished shape of the article, the mix itself may be brought to a condition in which it is moist, but without excess water. The article may be molded under pressure directly from this mix to its finished shape. The drying of the mix to this moist condition may be attained either by the removal of water from the mix or by its absorption by the ingredients of the mix.

While I have described the preferred procedure in carrying out my process, it is to be understood that the process is not limited to all of the herein described details or exact sequence of steps, but may be otherwise embodied and practiced within the scope of the following claims.

I claim:

1. The process of making rubber bonded abrasive articles, which comprises preparing a viscous, mushy, semi-solid yet stirrable mass of liquid and rubber so distributed therein as to thicken the mass sufficiently to hold the abrasive material in suspension during the mixing and forming of the article, mixing granular abrasive material with such mass, and forming the articles from the mixture in a mold, drying the articles at pressures less than atmospheric, and subjecting the dried articles to pressures sufficient to consolidate the rubber and abrasive grain.

2. The process of making rubber bonded abrasive articles, comprising preparing a viscous, mushy, semi-solid yet stirrable mass of liquid and rubber so distributed therein as to thicken the mass sufficiently to hold the abrasive material in suspension during the mixing, mixing granular abrasive material with such mass, shaping the articles from the mixture, and drying them.

3. The process of making rubber bonded abrasive articles, which comprises mixing abrasive particles with rubber curd and a vulcanizing agent, shaping the articles from the mixture and drying them, and vulcanizing them.

4. The process of making rubber bonded abrasive articles, which comprises concentrating latex, thickening the concentrated latex by means of a chemical coagulation and protecting the rubber particles so aggregated with a colloid sheath, mixing it with abrasive particles, and forming the articles from the mixture.

5. The process of making rubber bonded abrasive articles, which comprises forming a mix containing granular abrasive material, a vulcanizing agent and a viscous, mushy, semi-solid yet stirrable mass of water and rubber so distributed therein as to thicken the mass sufficiently to hold the abrasive material in suspension during the forming of the articles, shaping the articles from the mix, drying them, and vulcanizing them.

6. The process of making rubber bonded abrasive articles, which comprises forming a mixture containing abrasive grains, a vulcanizing agent and a viscous rubber emulsion containing rubber latex, forming the articles from the mixture, and drying and vulcanizing them.

7. The process of making rubber bonded abrasive articles, which comprises adding to rubber latex a coagulant sufficient in amount to thicken the latex so that the abrasive grains may be mixed and held suspended therein, forming a mixture containing such thickened latex, abrasive grains and a vulcanizing agent, shaping the articles from the mixture, and drying and vulcanizing them.

8. The improvement in the manufacture of rubber bonded articles containing granular material comprising admixing abrasive grain and a vulcanizing agent with a fluid rubber mixture containing rubber latex, shaping the mixture to the desired form, and subsequently drying and vulcanizing the thus shaped article.

9. The improvement in the manufacture of rubber bonded abrasive articles comprising treating rubber latex with an agent of a character and in an amount to increase the consistency of the latex so that granular material may be uniformly and intimately mixed and maintained suspended therein, incorporating abrasive grain and a vulcanizing agent in the mixture and shaping substantially to the form desired, and subsequently drying and vulcanizing the thus shaped article.

10. The process of making rubber bonded abrasive articles, comprising making a mix containing abrasive grain, a vulcanizing agent and a viscous mushy yet stirrable mass containing water and rubber so distributed therein as to thicken the mass sufficiently to prevent separation of the mass and the abrasive grain during the operations of mixing and of removing water, shaping abrasive articles therefrom and vulcanizing them, and removing water from the material subsequent to the mixing in of the abrasive grain and prior to the vulcanization of the articles.

11. The process of making rubber bonded abrasive articles, comprising making a mix containing abrasive grain, a vulcanizing agent and a viscous mushy yet stirrable mass containing water and rubber so distributed therein as to thicken the mass sufficiently to prevent separation of the mass and abrasive grain during the operations of mixing and of removing water, removing water from the mix, shaping abrasive articles from the mix, and vulcanizing them.

12. The process of making rubber bonded abrasive articles, comprising making a mix containing abrasive grain, a vulcanizing agent and a viscous mushy yet stirrable mass containing water and rubber so distributed therein as to thicken the mass sufficiently to prevent separation of the mass and the abrasive grain during the making and the drying of the mix, drying the mix, shaping abrasive articles from the dried mix, and vulcanizing them.

13. The process of making rubber bonded abrasive articles, comprising making a mix containing abrasive grain, a vulcanizing agent and a viscous mushy yet stirrable mass containing water and rubber so distributed therein as to thicken the mass sufficiently to prevent separation of the mass and the abrasive grain during the making of the mix and the shaping and drying of the articles, shaping abrasive articles from the mix, drying the shaped articles, and vulcanizing them.

14. The process of making rubber bonded abrasive articles which comprises mixing abrasive particles with a rubber curd and a vulcanizing agent, shaping the articles from the resulting mixture of curd, vulcanizing agent and abrasive particles, and vulcanizing such articles.

15. The process of making rubber bonded abrasive articles comprising preparing a viscous, mushy, semi-solid yet stirrable mass of liquid and rubber so distributed therein as to thicken the mass sufficiently to hold the abrasive material in suspension during the mixing, mixing granular abrasive material with such mass, and forming articles from the resulting mass of rubber and abrasive particles.

HARRY C. MARTIN.

CERTIFICATE OF CORRECTION.

Patent No. 1,953,984.　　　　　　　　　　　　　　　　April 10, 1934.

HARRY C. MARTIN.

It is hereby certified that error appears in the printed specification of the above numbered patent requiring correction as follows: Page 1, after line 43, insert the following as example 2:

2. The absorption of sufficient water by the addition of an absorbent material such as diatomaceous earth, to produce the curd.; line 44, for the numeral "2" read 3; and line 47, for "3" read 4; and that the said Letters Patent should be read with these corrections therein that the same may conform to the record of the case in the Patent Office.

Signed and sealed this 15th day of May, A. D. 1934.

Bryan M. Battey (Seal)　　　　　　　　　　　　　　　　　　　　　Acting Commissioner of Patents.